July 16, 1963
G. K. SNUGGINS
3,097,864
HITCH STABILIZER AND SUPPORT
Filed Sept. 18, 1961
2 Sheets-Sheet 1
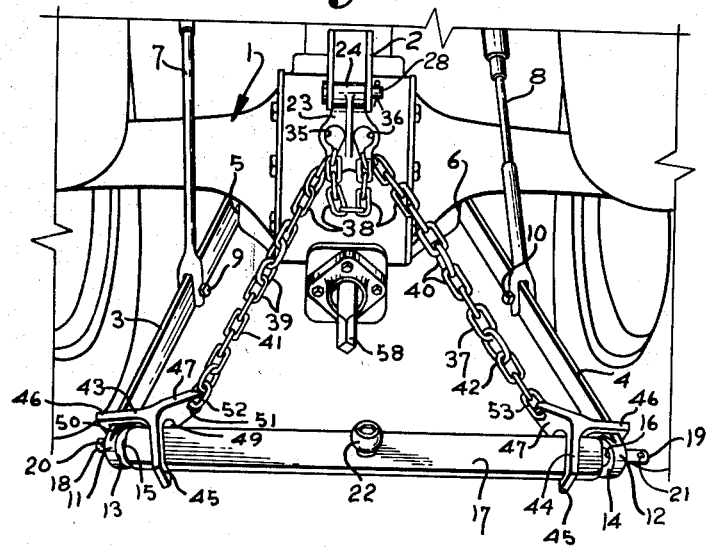
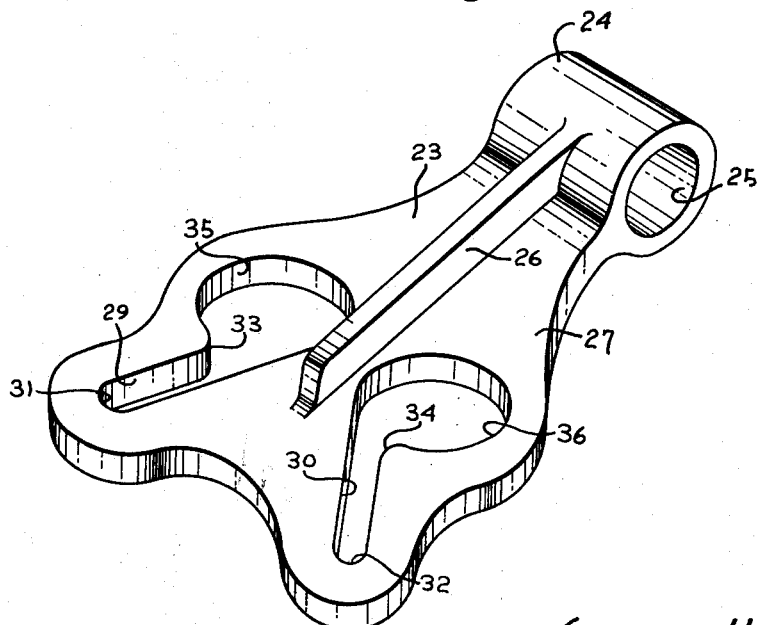
INVENTOR.
GEORGE K. SNUGGINS
BY
Fishburn & Gold
ATTORNEYS

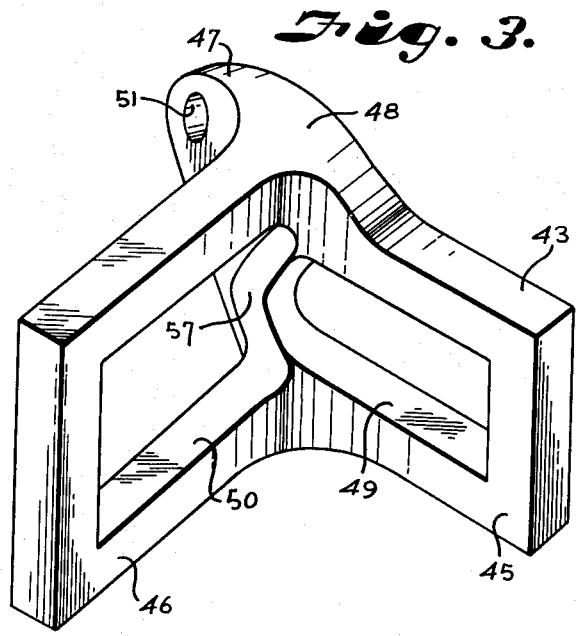
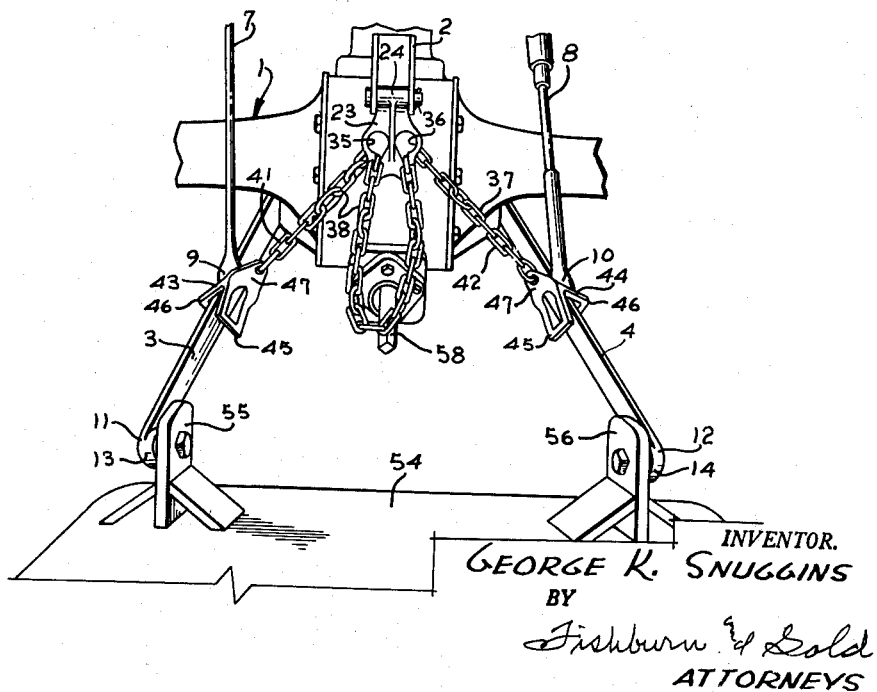

United States Patent Office 3,097,864
Patented July 16, 1963

3,097,864
HITCH STABILIZER AND SUPPORT
George K. Snuggins, Box 25, Tiff City, Mo.
Filed Sept. 18, 1961, Ser. No. 138,784
2 Claims. (Cl. 280—474)

This invention relates to tractor hitches, and more particularly to a removable device adapted for use on the so-called "Ford-Ferguson" type of tractor to provide adjustable hitch stabilization.

The common three-point tractor hitch normally found on the "Ford-Ferguson" type of tractor includes a pair of lower draw bars hydraulically supported by rods and respectively connected to a transverse hitch bar having a ball connector thereon. When pulling certain implements with this hitch, it is often necessary to provide lateral sway stabilizing members to prevent excess lateral sway of the hitch bar with respect to the tractor frame. Additional auxiliary members are commonly necessary to prevent a rotation of the hitch bar about the longitudinal axis thereof which would tend to disengage the ball connector. Further additional members are often required to vertically support the hitch bar with respect to the tractor frame so that constant loads are not supported by the tractor hydraulic system which would result in a slow downward settling and also tend to shorten the operative life thereof. It is apparent that the latternamed members must be adjustable and lockable so as to permit desired variations in hitch bar elevation.

The principal objects of the present invention are: to provide a single hitch stabilizer and support device which is adapted to perform the functions of the multiple members named above and heretofore required for the stated purposes; to provide such a device for use on a tractor hitch which performs said functions in a simple, safe and highly efficient manner; to provide such a support device which is inexpensive to build, light in weight and requires little or no maintenance; to provide such a device which is unitary in structure to prevent portions thereof being lost or misplaced; to provide such a stabilizing device which may be installed quickly without the use of hand tools; to provide such a device which provides a positive control to produce and maintain a lateral shift of the hitch bar if desired; to provide such a device which retains desirable operative functions when used with rear mounted implements having fixed spaced hitch connections so as to eliminate the need for a hitch bar; to provide such a device which eliminates the necessity for having retaining pins in the ends of the hitch bar; and to provide such a device which will not interfere with the power take-off of the tractor.

Other objects and advantages of this invention will become apparent from the following description taken in connection with the accompanying drawings wherein are set forth by way of illustration and example certain embodiments of this invention.

FIGURE 1 is a fragmentary perspective view of a tractor frame with the device embodying this invention operatively secured thereon.

FIGURE 2 is a perspective view on an enlarged scale of a chain anchor plate forming a portion of this invention.

FIGURE 3 is a perspective view on an enlarged scale showing a Y-shaped member forming a portion of this invention.

FIGURE 4 is a fragmentary perspective view of a tractor frame illustrating the use of the present invention with an implement having fixed spaced hitch connections.

Referring to the drawings in more detail:

The reference numeral 1 indicates generally a tractor frame of the so-called "Ford-Ferguson" type which has a transversely bored bifurcated lug 2 secured at the rear thereof in the usual manner. A pair of rearwardly diverging draw bars 3 and 4 are pivotally connected at the front ends 5 and 6 respectively thereof to the tractor frame at positions spaced downwardly and in opposite lateral directions from the lug 2. Hydraulically controlled lift rods 7 and 8 are pivoted to the draw bars 3 and 4 respectively at connections 9 and 10 intermediate the ends thereof. The rear ends 11 and 12 respectively of the draw bars 3 and 4 terminate in bosses 13 and 14 having transverse bores 15 and 16 extending therethrough.

A transversely extending hitch bar 17 terminates at opposite ends thereof in cylindrical shafts or studs 18 and 19 respectively engaged in the bores 15 and 16 for pivotal movement of the hitch bar 17 about the longitudinal axis thereof. The cylindrical studs 18 and 19 respectively have transverse bores 20 and 21 extending therethrough and adapted to receive pins (not shown) for the purpose of preventing the bosses 13 and 14 from accidentally sliding outwardly of and disengaging with the hitch bar 17. The hitch bar 17 is substantially rectangular in cross section between the draw bar bosses 13 and 14 and rigidly supports a ball connector 22 intermediate the ends thereof for securing to an implement (not shown) to be pulled by the tractor.

The instant invention includes an anchor member or chain anchor plate 23 having an enlarged rear terminus 24. A transverse bore 25 extends laterally through the rear terminus 24 and a strengthening rib 26 is formed integrally respectively with the rear terminus 24 and the body 27 of the chain anchor plate 23. The rear terminus 24 is adapted to engage in the bifurcated lug 2 and receive a pin 28 extending through the lug 2 and the transverse bore 25 for pivotally connecting the anchor plate 23 to the tractor frame 1, FIGURE 1.

The anchor plate 23 has a pair of elongated rearwardly diverging chain keeper slots 29 and 30 respectively extending through the body 27. The slots 29 and 30 are each peripherally closed at the rear end 31 and 32 respectively thereof and each slot communicates at the forward end 33 and 34 thereof with a respective enlarged chain slip opening 35 and 36 also extending through the chain anchor plate body 27.

A tension member or chain 37 has the intermediate links 38 thereof threaded through the chain slip openings 35 and 36 and selectively engageable in the slots 29 and 30, FIGURE 1. It is apparent that the outer links 39 and 40 of the chain 37 respectively form chain extensions 41 and 42 which may be selectively increased or decreased in length depending upon which of the intermediate links 38 are engaged in the respective slots 29 and 30.

A pair of Y-shaped securing members 43 and 44 each have a first leg 45, a second leg 46 and a third leg 47 respectively extending radially from a common portion 48. The first leg 45 has a slot 49 therethrough adapted to slidably receive the hitch bar 17 between the bosses 13 and 14 when said bosses are engaged with the cylindrical studs 18 and 19. The slot 49 is a shape which is adapted to engage the first leg 45 with the hitch bar 17 so as to key therewith whereby one will not pivot about the longitudinal axis of the hitch bar 17 without the other. The second leg 46 extends at an angle of about 90° from the first leg 45 and has a slot 50 therethrough adapted to slidably receive therethrough one of the bosses 13 and 14 and engage the respective draw bar 3 or 4 between said boss and the respective lift rod connections 9 or 10. The third leg 47 extends at an angle of about 135° from the first and second legs 46 and 47 and has a transverse bore 51 therethrough near the outer end thereof. The opposite end links 52 and 53 respectively of the chain 37 are engaged in the transverse bores 51 to provide anchors for the respective chain extensions 41 and 42.

The Y-shaped members 43 and 44 are assembled with the draw bars 3 and 4 and hitch bar 17 by first extending the respective boss through the respective slot 50 and aligning the boss bore with the respective hitch bar stud 18 or 19 and subsequently extending the hitch bar into the boss bore through the slot 49, FIGURE 1. It is apparent that when the hitch bar 17 is supported by the chain extensions 41 and 42 the tension on the respective Y-shaped members 43 and 44 will positively maintain the engagement of the hitch bar 17 with the respective draw bars and pins (not shown) which are normally inserted in the bores 20 and 21 are not required. It is also apparent that the engagement of the draw bar 17 in the slots 49 will prevent the pivoting or rotation of the hitch bar 17 about the longitudinal axis thereof.

If it is desired to adjust the hitch bar 17 laterally with respect to the tractor frame it is only necessary to shorten one of the chain extensions 41 or 42 while lengthening the other, this being done by engaging selected intermediate links 38 of the chain 37 in the slots 29 and 30. If it is desired to raise or elevate the hitch bar 17 with respect to the tractor frame it is only necessary to shorten both the chain extensions 41 and 42 in the manner noted above, the tractor hydraulic system (not shown) acting on the lift rods 7 and 8 generally being used to effect the initial lifting and subsequently being rendered inoperative whereby the weight or downward force on the hitch bar 17 is taken up by the chain 37. The lowering of the hitch bar 17 may be accomplished by slightly raising same, if desired, by the lift rods 7 and 8 so as to disengage the links from the slots 29 and 30 and then slipping a desired length of chain through the respective openings 35 and 36 to provide chain extensions 41 and 42 of the required length to support the hitch bar 17.

Referring to FIGURE 4, it is sometimes desired to pull an implement 54 of the type having fixed spaced draw connectors 55 and 56 secured thereto for direct coupling with the bosses 13 and 14, eliminating the need for a hitch bar 17. In this event, advantage can still be derived from the hitch stabilizer and support device of this invention by permitting the respective Y-shaped members 43 and 44 to slide longitudially of the respective draw bars 3 and 4 by extending same through the slots 50 until the Y-shaped members 43 and 44 respectively come to rest in engagement with the lift rod connections 9 and 10 intermediate the ends of the draw bars 3 and 4. It is noted that the forward end wall 57 of the slots 50 are curved and beveled so as to provide a suitable bearing surface against the respective connections 9 and 10 of the lift rods 7 and 8. As shown in FIGURE 4, the chain 37 cooperates with the Y-shaped members 43 and 44 and the chain anchor plate 23 to provide lateral stability and vertical support for the draw bars 3 and 4 when said draw bars are connected to the implement 54.

It is noted that the hitch stabilizer and support device of this invention does not interfere with the power take-off 58 of the tractor. It is further noted that the chain 37 extends upwardly and away from the draw bars 3 and 4 so as not to form a severely acute angle therewith which would tend to act as a trap for picking up brush and the like which often occurs with many types conventional stabilizing members or bars.

It is to be understood that while I have illustrated and described one form of my invention it is not to be limited to the specific form or arrangement of parts herein described and shown except insofar as such limitations are included in the claims.

What I claim and desire to secure by Letters Patent is:

1. A hitch bar stabilizer and support device for use on a hitch for a tractor, said hitch being of the type having a pair of rearwardly diverging flexible tension members secured at one end respectively to the tractor and a pair of rearwardly extending drawbars pivotally connected to the tractor at the front ends thereof, the rear ends of said drawbars terminating in bosses having transverse bores therethrough, and a transversely extending hitch bar pivotally engaged at opposite ends thereof in said drawbar boss bores, said hitch bar being substantially rectangular in cross section between said drawbar bosses, said device comprising; a Y-shaped member having a first, a second and a third radially extending leg, said first leg having means forming a slot therethrough slidably receiving said hitch bar between said drawbar bosses and engaging said hitch bar for pivoting therewith, said second leg having means forming a slot therethrough slidably receiving one of said drawbar bosses and engaging the respective drawbar, said third leg being connected to the other end of one of said tension members, whereby said device stabilizes said hitch bar with respect to said hitch and prevents pivoting of said hitch bar about the longitudinal axis thereof.

2. The device called for in claim 1 wherein said flexible tension members are chains and said second leg extends at an angle of about 90 degrees from said first leg and said third leg extends at an angle of about 135 degrees from said first and second legs and has means forming a transverse bore therethrough, the end link of one of said chains being engaged in said third leg bore.

References Cited in the file of this patent

UNITED STATES PATENTS

| | | |
|---|---|---|
| 887,578 | Beyer | May 12, 1908 |
| 1,871,519 | Hawley | Aug. 16, 1932 |
| 2,609,215 | Hancock | Sept. 2, 1952 |
| 2,633,786 | Pursche | Apr. 7, 1953 |